(12) United States Patent
Xie

(10) Patent No.: US 10,623,560 B2
(45) Date of Patent: Apr. 14, 2020

(54) METHOD AND SERVER FOR SECURING COMMUNICATION NUMBER

(71) Applicant: Alibaba Group Holding Limited, Grand Cayman (KY)

(72) Inventor: Daocheng Xie, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 6 days.

(21) Appl. No.: 15/097,220

(22) Filed: Apr. 12, 2016

(65) Prior Publication Data

US 2016/0301664 A1 Oct. 13, 2016

(30) Foreign Application Priority Data

Apr. 13, 2015 (CN) .......................... 2015 1 0173924

(51) Int. Cl.
*H04M 3/42* (2006.01)
*H04M 3/22* (2006.01)
(52) U.S. Cl.
CPC ....... *H04M 3/42008* (2013.01); *H04M 3/229* (2013.01); *H04M 3/42059* (2013.01); *H04M 3/42102* (2013.01)
(58) Field of Classification Search
CPC ............. H04M 3/42008; H04M 3/229; H04M 3/42059; H04M 3/42102
(Continued)

(56) References Cited

U.S. PATENT DOCUMENTS 6,567,848 B1 5/2003 Kusuda et al.
8,676,181 B2 3/2014 Pratt et al.
(Continued)

FOREIGN PATENT DOCUMENTS

CN 1424842 A 6/2003
CN 101089888 A 12/2007
(Continued)

OTHER PUBLICATIONS

PCT Search Report and Written Opinion dated Jul. 14, 2016 for PCT Application No. PCT/US16/27158, 11 pages.
(Continued)

*Primary Examiner* — Chi Tang P Cheng
(74) *Attorney, Agent, or Firm* — Lee & Hayes, P.C.

(57) ABSTRACT

An interaction method includes receiving an order request sent by a first communication terminal, and acquiring a first communication number according to the order request; allocating a second communication number to the first communication number, and setting a correlation between the first communication number and the second communication number; sending first correlation information to a basic communication server, the first correlation information carrying the first communication number and the second communication number; binding the second communication number with the order request; issuing the order request, the order request carrying the second communication number; receiving response information sent by a second communication terminal, and obtaining a third communication number according to the response information; and sending second correlation information to the basic communication server, the second correlation information carrying at least the second communication number and the third communication number. The interaction method effectively protects user privacy.

18 Claims, 5 Drawing Sheets

(58) Field of Classification Search
USPC .......................................................... 370/259
See application file for complete search history.

(56) References Cited

U.S. PATENT DOCUMENTS

| | | |
|---|---|---|
| 2001/0029485 A1 | 10/2001 | Brody et al. |
| 2002/0136167 A1 | 9/2002 | Steele et al. |
| 2003/0191676 A1 | 10/2003 | Templeton |
| 2005/0076124 A1 | 4/2005 | Enderlein et al. |
| 2005/0086160 A1 | 4/2005 | Wong et al. |
| 2005/0131757 A1 | 6/2005 | Chan et al. |
| 2005/0246419 A1 | 11/2005 | Jaatinen |
| 2007/0047478 A1 | 3/2007 | Balachandran et al. |
| 2007/0286208 A1* | 12/2007 | Kanada .................. H04L 41/12 370/395.53 |
| 2008/0084982 A1 | 4/2008 | Chatterjee |
| 2009/0124270 A1 | 5/2009 | Kelley |
| 2009/0305691 A1 | 12/2009 | Suetsugu et al. |
| 2010/0216494 A1 | 8/2010 | Abdel-Moiti Moik |
| 2010/0312903 A1 | 12/2010 | Miyata |
| 2011/0159861 A1 | 6/2011 | Pratt et al. |
| 2012/0100830 A1* | 4/2012 | Barber .............. H04M 3/42008 455/410 |
| 2012/0207297 A1 | 8/2012 | Tian et al. |
| 2012/0246696 A1 | 9/2012 | Boukobza |
| 2014/0146954 A1* | 5/2014 | Noldus ............... H04L 61/2539 379/114.01 |
| 2015/0092612 A1 | 4/2015 | Zhu et al. |
| 2015/0242645 A1 | 8/2015 | Burger et al. |
| 2015/0302413 A1 | 10/2015 | Dua |
| 2016/0301663 A1 | 10/2016 | Xie |
| 2016/0301800 A1 | 10/2016 | Xie |

FOREIGN PATENT DOCUMENTS

| | | |
|---|---|---|
| CN | 101159778 A | 4/2008 |
| CN | 101827355 A | 9/2010 |
| CN | 102624995 A | 8/2012 |
| CN | 103391377 A | 11/2013 |
| CN | 103477618 A | 12/2013 |
| CN | 104080069 A | 10/2014 |
| CN | 104093136 A | 10/2014 |
| CN | 104104681 A | 10/2014 |
| JP | 2010087762 A | 4/2010 |
| JP | 2013135417 A | 7/2013 |

OTHER PUBLICATIONS

PCT Search Report and Written Opinion dated Jul. 15, 2016 for PCT Application No. PCT/US16/27152, 12 pages.
Office Action for U.S. Appl. No. 15/097,195, Xie, dated Jun. 14, 2017, "Method and Server for Securing Communication Number", 10 pages.
PCT Search Report and Written Opinion dated Jul. 26, 2016 for PCT Application PCT/US16/27160, 7 pages.
Office Action for U.S. Appl. No. 15/097,195, Xie, dated Dec. 28, 2017, "Method and Server for Securing Communication Number", 10 pages.
Office action for U.S. Appl. No. 15/097,238, dated Apr. 19, 2018, Xie, "Communication Method and Server", 25 pages.
Final Office Action for U.S. Appl. No. 15/097,238 "Communication Method and Server," Xie, dated Nov. 16, 2018, 22 pages.
Office Action for U.S. Appl. No. 15/097,238 dated Nov. 18, 2019, Xie, "Communication Method and Server," 22 Pages.
The Chinese Search Report dated Sep. 10, 2018 for Chinese Patent Application No. 201510172447.1, 2 pages.
English-language translation of First Office Action dated Aug. 1, 2018 by the State Intellectual Property Office of the People's Republic of China in corresponding Application No. 201510173923 (13 pages).
The Chinese Office Action dated Dec. 5, 2018 for Chinese patent application No. 201510173924.6, a counterpart foreign application of U.S. Appl. No. 15/097,220, 9 pages.
English-language translation of Second Office Action dated Apr. 2, 2019 by the State Intellectual Property Office of the People's Republic of China in corresponding Application No. 201510173923, 23 pages.
The Chinese Search Report dated Jul. 23, 2018 for Chinese Application No. 2015101739231, 1 page.
The Chinese Search Report dated Nov. 27, 2018 for CN Patent Application No. 2015101739246, 2 pages.
Machine translation of first Chinese office action for Chinese patent application No. 201510172447.0, dated Sep. 30, 2018, a counterpart foreign application of U.S. Appl. No. 15/097,195, 8 pages.
The supplemental Chinese Search Report dated Apr. 13, 2015 for Chinese Application No. 2015101739231, 1 page.
Non Final Office Action dated Mar. 29, 2019 for U.S. Appl. No. 15/097,238 "Communication Method and Server," Xie, 22 pages.
The Japanese Office Action dated Jan. 7, 2020 for Japanese Patent Application No. 2017-549407, a counterpart of U.S. Appl. No. 15/097,238, 8 pages.

* cited by examiner

METHOD AND SERVER FOR SECURING COMMUNICATION NUMBER

CROSS REFERENCE TO RELATED APPLICATION

The present disclosure is the U.S. National Application under 35 U.S.C. 119 filed Apr. 12, 2016 as U.S. patent application Ser. No. 15/097,220, which claims the benefit of Chinese Patent Application Number 201510173924.6 filed on Apr. 13, 2015, entitled "METHOD AND APPARATUS FOR ORDER DATA INTERACTION," which is hereby incorporated by reference in its entirety. This application is also related to commonly-assigned applications entitled "COMMUNICATION METHOD AND SERVER", which claims the priority of Chinese Patent Application Number 201510173923.1 filed Apr. 13, 2015, entitled "METHOD AND APPARATUS FOR ORDER DATA INTERACTION," filed in the U.S. under 35 U.S.C. 119 on Apr. 12, 2016 as U.S. patent application Ser. No. 15/097,238 and "METHOD AND SEVER FOR SECURING COMMUNICATION NUMBER", which claims the priority of Chinese Patent Application Number 201510172447.1 filed on Apr. 13, 2015, entitled "METHOD AND APPARATUS FOR ORDER DATA INTERACTION," filed in the U.S. under 35 U.S.C. 119 on Apr. 12, 2016 as U.S. patent application Ser. No. 15/097,195. The contents of the above commonly-assigned applications are hereby incorporated by reference.

TECHNICAL FIELD

The present disclosure relates to the field of communications, and, more particularly, to an order data interaction method and a server.

BACKGROUND

Communication number, such as a telephone number, is the privacy of user that sometimes has to be provided to third parties for communication. The technical problem concerns how to conduct the communication with third parties without disclosing the user's communication number to the third parties.

Generally, privacy refers to certain personal information that a person or other entity is not willing to share with others. With the development of social economics, too many privacy leakage cases occur, which causes great concern about the protection of privacy.

A telephone number is an example of information a person may want to maintain as private. A person may selectively inform others of his/her own telephone number to maintain communications between the person and the selected others, but may not want his/her own telephone number to be is otherwise distributed, which could lead to cheating calls, various promotion advertisements, junk short messages, as well as other adverse consequences.

Unfortunately, it is difficult for a network system under the conventional techniques to protect user privacy, especially telephone numbers. For example, in daily life, when people usually conduct online shopping or online taxi booking service, the network system under the conventional techniques requests the users to provide telephone numbers, so as to facilitate communications with online stores, logistics companies, or taxi drivers. Accordingly, the online stores, logistics companies, or taxi drivers obtain the users' names and telephone numbers through the network system. In this way, after a long-term operation, the online stores, logistics companies, or taxi drivers can accumulate a large number of contact information of the users. If their business operations or managements are conducted inappropriately, the users' contact information may be leaked, that is, user privacy is leaked. Moreover, after the consumers buy some commodities or services, they also acquire the sellers' contact information. In some cases, if the consumers feel unsatisfied with the seller, they may frequently hassle the seller. Therefore, the network under the conventional techniques is hard to effectively protect user privacy.

SUMMARY

An object of the example embodiments of the present disclosure is to provide a data interaction method, system, and server that protect user privacy. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

To solve the above technical problems, the present disclosure provides an order data interaction method, which includes: receiving an order request sent by a first communication terminal, and acquiring a first communication number according to the order request; allocating a second communication number to the first communication number, and setting a correlation between the first communication number and the second communication number; sending correlation information to a basic communication server, and the correlation information carries the first communication number and the second communication number; binding the second communication number with the order request; issuing the order request, in which the order request carries the second communication number; receiving response information from a second communication terminal, and acquiring a third communication number according to the response information; and sending second correlation information to the basic communication server, in which the second correlation information at least carries the second communication number and the third communication number.

The present disclosure further provides a server, which includes: an order receiving module that receives an order request from a first communication terminal, and acquires a first communication number according to the order request; an allocating module that allocates a second communication number to the first communication number, and sets a correlation between the first communication number and the second communication number; a first correlation information sending module that sends correlation information to a basic communication server, the correlation information carrying the first communication number and the second communication number; a binding module that binds the second communication number with the order request; an order request issuing module that issues the order request, in which the order request carries the second communication number; a response information receiving module that receives response information from a second communication terminal, and acquires a third communication number according to the response information; and a second correlation information sending module that sends second correlation information to the basic communication server, in which the second correlation information at least carries the second communication number and the third communication number.

The present disclosure further provides an order data interaction method, which includes: receiving an order request from a first communication terminal, and acquiring a first communication number according to the order request; sending a temporary number allocation request to a basic communication server, the temporary number allocation request carrying the first communication number; receiving a second communication number, correspondingly allocated to the first communication number, returned by the basic communication server; binding the second communication number with the order request; issuing the order request, in which the order request carries the second communication number; receiving response information sent by a second communication terminal, and acquiring a third communication number according to the response information; and sending correlation information to the basic communication server, in which the correlation information at least carries the second communication number and the third communication number.

The present disclosure further provides a server, which includes: an order receiving module that receives an order request from a first communication terminal, and acquires a first communication number according to the order request; a temporary number request sending module that send a temporary number allocation request to a basic communication server, the temporary number allocation request carrying the first communication number; a temporary number receiving module that receives a second communication number, correspondingly allocated to the first communication number, returned by the basic communication server; a binding module that binds the second communication number with the order request; an order request issuing module that issues the order request, in which the order request carries the second communication number; a response information receiving module that receives response information sent by a second communication terminal, and acquires a third communication number according to the response information; and a correlation information sending module that sends correlation information to the basic communication server, in which the correlation information at least carries the second communication number and the third communication number.

As shown from the technical solutions provided by the example embodiments of the present disclosure, during the flow processing of order data, the present disclosure binds a temporarily allocated temporary communication number with an order request and sets a correlation between the second communication number and the first communication number used by the user acting as the buyer or the seller. Thus, during the whole flow for processing the order request, a third party associated with both the buyer and the seller may only acquire the second communication number, and contact the user by using the second communication number. The techniques of the present disclosure thus effectively avoid the leakage of the communication numbers of he buyer and the seller, prevent the third party from acquiring the first communication number used by the user, and protect user privacy of both the seller and the buyer.

BRIEF DESCRIPTION OF THE DRAWINGS

To clearly demonstrate the technical solutions in the example embodiments of the present disclosure, the accompanying drawings that are used in the descriptions of the present disclosure are briefly introduced below. Apparently, the accompanying drawings described below merely represent some of implementations of the present disclosure. Persons of ordinary skill in the art may further derive other accompanying drawings with reference to the accompanying drawings herein, without making creative efforts.

DETAILED DESCRIPTION

To enable those skilled in the art to better understand the technical solutions of the present disclosure, the example embodiments of the present disclosure are described below with reference to the accompanying drawings. Apparently, the described example embodiments merely represent a part of and not all of the embodiments of the present disclosure. Based on the example embodiments of the present disclosure, all the other example embodiments derived by persons of ordinary skill in the art, without using creative efforts, shall fall within the protection scope of the present disclosure.

Figure 1:
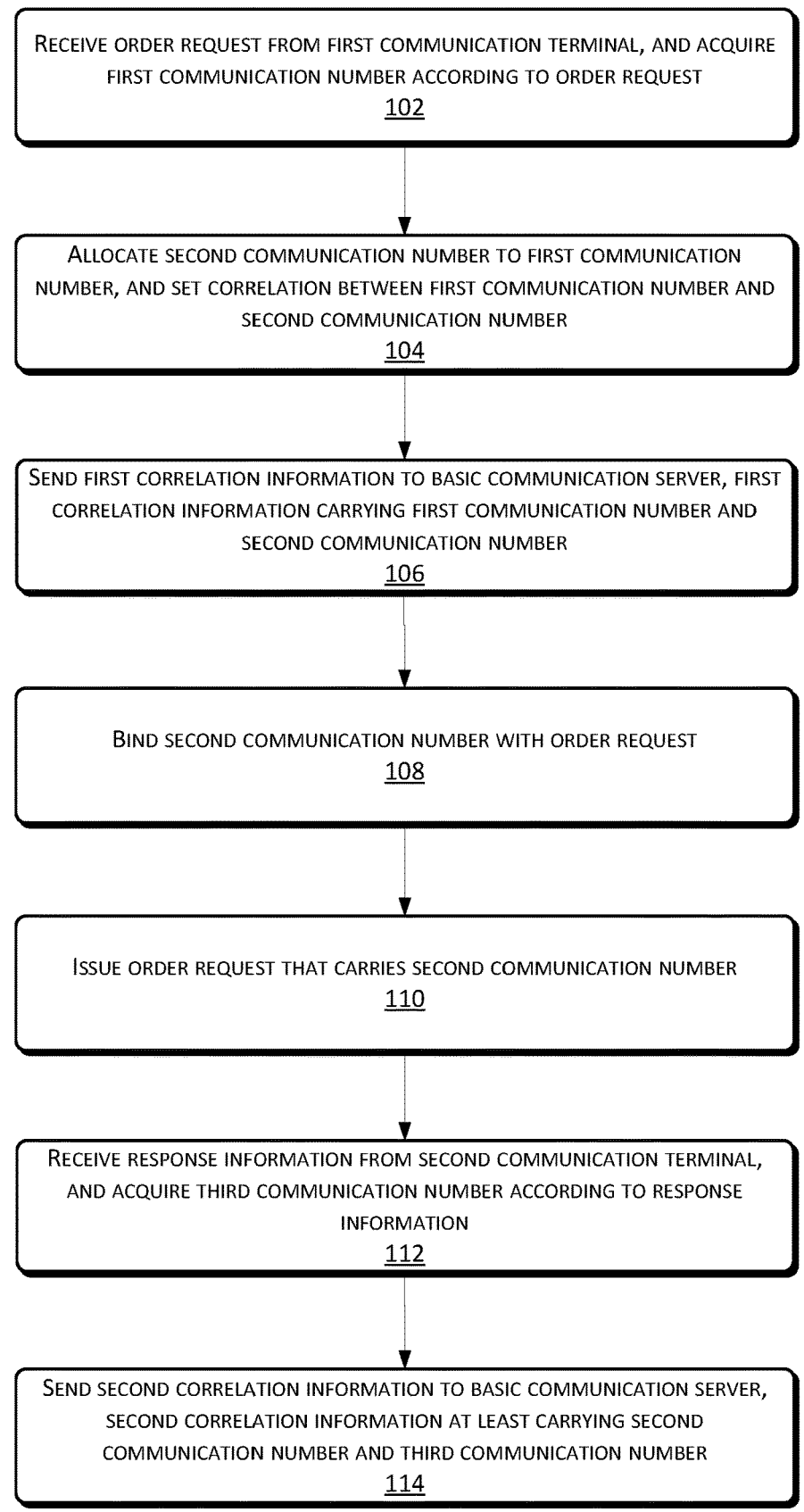
FIG. 1 is a flow chart of an example data interaction method according to an example embodiment of the present disclosure.

Referring to FIG. 1, which is a flow chart of a data interaction method provided according to an example embodiment of the present disclosure, in which the method includes the following steps.

At 102, an order request from a first communication terminal is received, and a first communication number according to the order request is acquired.

In this example embodiment, the first communication terminal may be a smart phone, a desktop computer, a notebook computer, a tablet personal computer, or a smart wearable device. Certainly, the first communication terminal may also be a software entity that is executable by any of the devices listed above, and the first communication terminal is used by a user to send an order request.

In this example embodiment, the order request may include ordering evidence in a trading transaction, and its specific content may include a commodity and/or service ordered by a user.

In this example embodiment, the order request may carry the first communication number, and, for example, the order request may include the first communication number. In this way, after the order request is received, the first communication number is acquired. The order request may also not include the first communication number. In this case, through identity information included in the order request, the first communication number corresponding to the identity information is read from a database such as a local database.

In this example embodiment, the first communication number may be a user's telephone number, which may be a landline telephone number or a mobile phone number. There is no restriction on the number segment.

At 104, a second communication number is allocated to the first communication number, and a correlation between the first communication number and the second communication number is set.

In this example embodiment, the second communication number may be used as a temporary communication number. The allocating a second communication number to the first communication number may include: pre-storing at least one second communication number locally, and selecting one from the at least one second communication number to allocate to the first communication number; or, after the order request is received, generating a second communication number according to a pre-set rule.

In an example embodiment, a communication number set is set locally, and the communication number set includes at least one second communication number. In this way, a value range of the second communication number is effectively defined, and usage condition of the second communication number is managed. For example, in the current situation of selecting the existing communication numbers, it is feasible to use the seldom used numbers as temporary communication numbers; it is also feasible to use numbers in a certain segment as temporary communication numbers. For example, numbers falling within "95000000000~95011111111" are taken as temporary communication numbers.

In this example embodiment, the correlation between the first communication number and the second communication number is set. For example, such set may include the following: the second communication number and the first communication number may be stored and correlated with each other in a manner of a data table, one column in the data table stores the first communication number, another column stores the second communication number, and the first communication number and the second communication number correlated with each other are located in the same line. Alternatively, the first communication number and an index of the second communication number may be stored corresponding to each other. For instance, a serial number is given to each second communication number in the communication number set, and the serial number is an index of the corresponding second communication number. By using the index, a second communication number is uniquely determined. Thus, by way of storing the first communication number and the index of the second communication number corresponding to each other, the second communication number corresponding to the first communication number is figured out.

At 106, first correlation information is sent to a basic communication server and the first correlation information carries the first communication number and the second communication number.

In this example embodiment, the basic communication server may be a server of a telecom operator, which calls a communication number according to a call request.

In this example embodiment, sending the first correlation information to the basic communication server indicates that there is a need to correlate the first communication number with the second communication number carried by the first correlation information.

In this example embodiment, the first correlation information carries the first communication number and the second communication number, and it is feasible to use both the first communication number and the second communication number as content or a part of the content of the first correlation information. Alternatively, it is feasible to use one of the second communication number and the first communication number as content or a part of the content of the correlation information, with the other one being used as an attachment. Alternatively, it is feasible to use both the second communication number and the first communication number as attachments of the correlation information. For example, the second communication number is "12345678900", the first communication number is "17095058888". A content of the first correlation information is "binding 095058888&12345678900", "17095058888&12345678900", "binding 17095058888" with "12345678900" as an attachment, "binding 12345678900" with "17095058888" as an attachment, or "binding" with both "17095058888" and "12345678900" used as the attachments.

At 108, the second communication number is bound with the order request.

In this example embodiment, by way of binding the second communication number with the order request, in a subsequent step for processing the order request, when a third party reads and processes the order request, the third party can only acquire the second communication number instead of the user's first communication number. Thus, the techniques of the present disclosure effectively protect the user's communication number.

In this example embodiment, the way of binding the second communication number with the order request may include: setting the second communication number as a part of the content of the order request; setting the second communication number as an attachment of the order request; storing the order request and the second communication number in a corresponding relationship; or storing an order serial number of the order request and the second communication number in a corresponding relationship, in which the order serial number uniquely identifies one order request. Certainly, the way of binding the second communication number with the order request is not limited to the above cited examples, and those skilled in the art may further make other variations under the teaching of the technical essence of the present disclosure, while all the variations shall fall within the protective scope of the present disclosure as long as the implemented functions and effects thereof are the same as or similar to that of the present disclosure.

At 110, the order request is issued and the order request carries the second communication number.

In this example embodiment, the issuing the order request may include: issuing the order request by way of broadcasting, so that other communication terminals may acquire information of the order request by communicating with the server. Alternatively, the issuing the order request may also include sending the order request to a designated communication terminal.

In this example embodiment, the order request carries the second communication number. The second communication number may be a part of content of the order request; or the second communication number may be an attachment of the order request.

At 112, response information is received from a second communication terminal, and a third communication number is acquired according to the response information.

In this example embodiment, the second communication terminal may be a smart phone, a desktop computer, a notebook computer, a tablet personal computer, or a smart wearable device. Certainly, a user terminal may also be a software entity that is executable by any of the devices listed above. The second communication terminal may be set at commercial operating places or facilities, for example, stores for selling products, companies for providing logistics services, or taxies.

In this example embodiment, after receiving the order request, the second communication terminal makes a response to the order request, and sends the response information. For example, the order request is taxi booking information sent by a user to a taxi platform. After the taxi platform issues the taxi booking information, communication terminals, used by taxi drivers, which are connected with the taxi platform receive the taxi booking information. Once a certain taxi driver uses the communication terminal to send response information at the earliest time, it indicates that the taxi driver obtains the order successfully, and may further contact the user who sent the taxi booking information.

In this example embodiment, the acquiring a third communication number according to the response information includes: for example, when the third communication number is a part of content of the response information, directly reading the third communication number from the response information; when the third communication number is an attachment of the response information, reading the attachment of the response information after the response information is acquired to further obtain the third communication number; or when the response information further carries identity information, looking up a communication number corresponding to the identity information from stored data according to the identity information, that is, the third communication number.

At 114, second correlation information is sent to the basic communication server, and the second correlation information at least carries the second communication number and the third communication number.

In this example embodiment, after the response information is received, the third communication number in the response information is sent to the basic communication server. The basic communication server binds the third communication number with the second communication number. Since the second communication number and the first communication number have a binding relation therebetween, the third communication number is correlated with the first communication number through the second communication number. After receiving a communication request from the first communication number to the second communication number, the basic communication server converts the communication request into a call to the third communication number, thereby establishing communications between a communication device using the first communication number and a communication device using the third communication number. Furthermore, a current calling number provided to the communication device using the third communication number is the second communication number, so that the communication device using the third communication number cannot obtain the first communication number, and meanwhile, the communication device using the first communication number cannot obtain the third communication number either. Similarly, after receiving a communication request from the third communication number to the second communication number, the basic communication server converts it into a call to the first communication number, thereby establishing a communication between the communication device using the third communication number and the communication device using the first communication number, and a current calling number provided to the communication device using the first communication number is the third communication number.

The example embodiment of the present disclosure enables the communication devices of two communication parties to establish communications by way of dialing the second communication number, in which both parties do not need to know the communication number of the other side, thereby effectively avoiding the leakage of users' communication numbers and effectively protecting user privacy.

In an example embodiment, the method further includes binding the third communication number with the order request, which indicates that the order request has been obtained by the communication device using the third communication number, and communication devices using other communication numbers cannot respond to the order request any more.

In an application scenario, a user issues an order request through online shopping. A server receives the order request, reads a first communication number carried in the order request, allocates a second communication number to the first communication number, and sends first correlation information to a basic communication server to bind the first communication number with the second communication number. The server issues the order request, and sends the order request to a communication terminal of a commodity seller, in which the second communication number is used as a part of a content of the order request, and replaces the first communication number in the order request. The server receives response information provided by the seller's communication terminal, acquires the seller's third communication number according to the response information, and sends second correlation information to the basic communication server, to bind the second communication number with the third communication number, thereby implementing a triplet binding relation among the first communication number, the second communication number, and the third communication number. The buyer or the seller establishes communication with each other by calling the second communication number using their respective communication terminal, without acquiring the communication number of the other side, thereby protecting privacy of both the buyer and the seller.

In another application scenario, a user may initiate an order request for booking a taxi through a taxi booking software. A server receives the order request, acquires a first communication number carried in the order request, allocates a second communication number to the first communication number, and sends first correlation information to a basic communication server, to correlate the first communication number with the second communication number. The server issues the order request, to enable communication devices having communication relations with the server to receive information about the order request, and to acquire the second communication number having a binding relation with the order request. After a taxi driver sends response information, it indicates that a taxi booking contract is formed between the user and the taxi driver. The server acquires the taxi driver's communication number according to the response information, and sends second correlation information to the basic communication server, to bind the taxi driver's communication number with the second communication number, thereby implementing a triplet binding relation among the user's communication number, the second communication number, and the taxi driver's communication number. In this case, the user or the taxi driver establishes communications with each other by calling the second communication number, without acquiring the communication number of the other side, which protects privacy of the user and the taxi driver.

Figure 2:
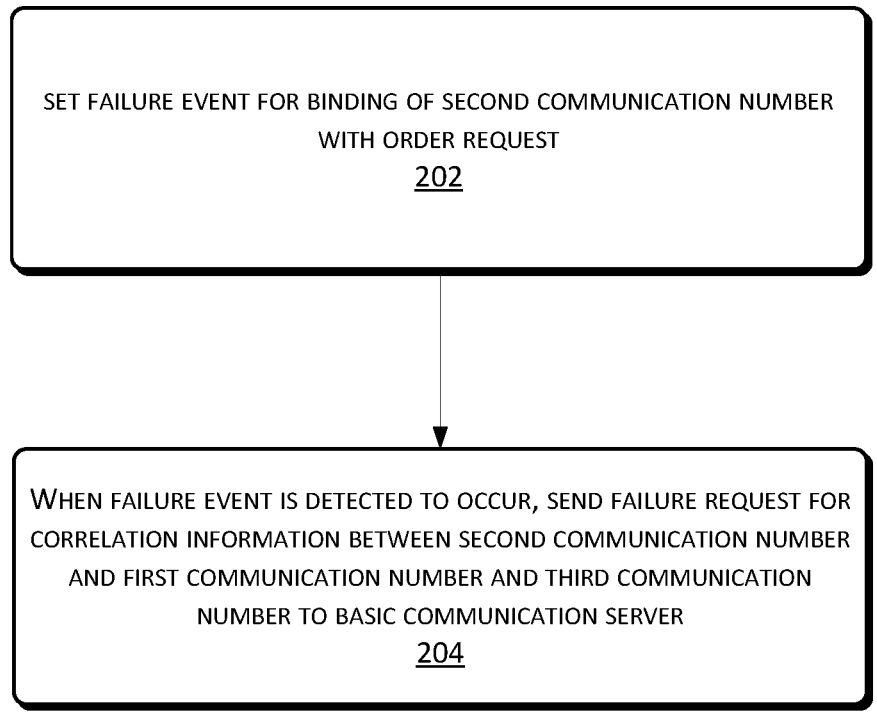
FIG. 2 is a flow chart of an example data interaction method according to an example embodiment of the present disclosure.

Referring to FIG. 2, in an example embodiment of the present disclosure, the above described method further includes the following operations:

At 202, a failure event is set for the binding of the second communication number with the order request.

At 204, when the failure event is detected to occur, a failure request for the correlation information between the second communication number and the first communication number and the third communication number is sent to the basic communication server.

In this example embodiment, by way of setting a failure event for the binding of the second communication number with the order request, once the failure event occurs, the binding relation between the second communication number and the order request is released, which further enables the basic communication server to release the binding relation between the first communication number, the second communication number, and the third communication number. Thus, when the processing of one order request is finished, both parties in the order request processing could not contact each other via the second communication number. Thus, even if the second communication number controlled by a third party leaks, both parties would not be hassled.

In this example embodiment, a failure time is set for the order request, which may start calculating from a time point when the order request is generated. The failure event may include that a current time length of the order request exceeds the failure time. The failure event may also include that a state of the order request is switched to completed or failed. That is, when the order request is processed, its state is changed along with the progress. The states may include states such as the request having been delivered, the request having been acknowledged by the seller, the request having been paid by the buyer, the goods having been shipped by the seller, and the transaction being completed, and so on. A state that a goods receipt has been confirmed may indicate that the order request is completed. Certainly, the state may further include: the request having been delivered, the order being circled, the order having been successfully accepted, the order being completed, and so on. During the above process, if both the seller and the buyer cancel the transaction, the order request then becomes invalid. Certainly, the failure event may further include other events, and those skilled in the art may further make other variations under the teaching of the technical essence of the present disclosure, while all the variations shall fall within the protection scope of the present disclosure as long as the implemented functions and effects thereof are the same as or similar to that of the present disclosure.

In this example embodiment, when a set failure event occurs, a failure request is sent to the basic communication server, so that the basic communication server may cancel the correlation between the first communication number, the second communication number, and the third communication number according to the failure request. Thus, when receiving a communication request from the first communication number to the second communication number, the basic communication server will not convert the communication request into a call to the first communication number. When receiving a communication request from the third communication number to the second communication number, the basic communication server will not convert the communication request into a call to the first communication number. Thus, when the failure event occurs, both parties involved with the order request cannot establish communication with each other according to the second communication number, thereby effectively avoid leaking of the communication number.

In an example embodiment, the failure event includes that a current time exceeds a set valid time. In this example embodiment, a valid time is set for the order request. The valid time may be a specific time point, and when a current time exceeds the specific time point, it indicates that the current time exceeds the set valid time. For example: the valid time is 24:00, Mar. 10, 2015, and when a current time exceeds this time point, the order request may be automatically invalid. The valid time may also be a time length, which may be calculated from a time point when the order request is generated, or may be calculated since the server receives the order request. When a difference between a current time and the time point when the order request starts to be calculated is larger than a set time length, it indicates that the current time exceeds the set valid time. For example, the time length is 10 days, and a time point when the order request is generated is 12:00, Feb. 11, 2015. When a difference between the current time and the time point when the order request is generated is larger than 10 days, the order request is invalid.

In an example embodiment, the failure event is determined according to a state of the order request. The failure event includes that the order request is invalid. In this example embodiment, at different stages of a life cycle of the order request, the order request may have different states. The failure event includes that the order request is invalid, which indicates that the order request is in a failure state. In a specific example embodiment, taking online shopping for example, the order request is generated when submitted by a user, processed by a store, and then a logistics company delivers the goods of the order request. The order request may involve the following states such as the request having been delivered, the request having been acknowledged by the seller, the request having been paid by the buyer, the goods having been delivered by the seller, the transaction being canceled and the transaction being completed, and so on. When the state of the order request is the transaction being completed or the transaction being canceled, it may indicate that the order request is invalid. In a specific example embodiment, taking online taxi booking service for example, the order request may involve states such as the request having been delivered, the order being scrambled for, the order having been successfully scrambled, the order being completed, and so on. When the state of the order request is the order being completed, it may indicate that the order request is invalid.

Figure 3:
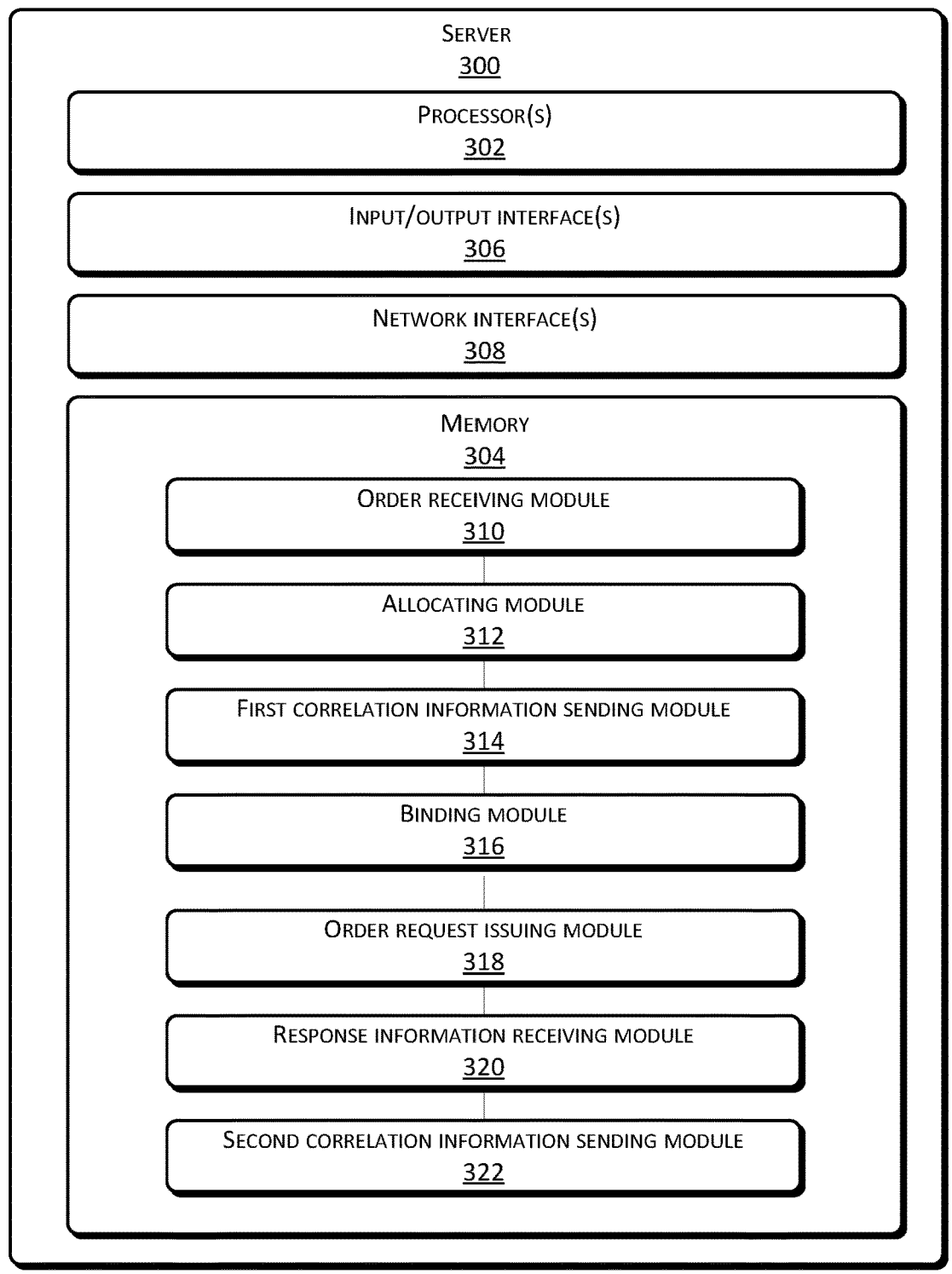
FIG. 3 is a block diagram of an example server according to an example embodiment of the present disclosure.

Referring to FIG. 3, an example embodiment of the present disclosure further provides a server 300, which includes one or more processor(s) 302 or data processing unit(s) and memory 304. The server 300 may further include one or more input/output interface(s) 306, and network interface(s) 308. The memory 304 is an example of computer-readable media.

The computer-readable media includes volatile and non-volatile, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 304 may store therein a plurality of modules or units including an order receiving module 310, an allocating module 312, a first correlation information sending module 314, a binding module 316, an order request issuing module 318, a response information receiving module 320, and a second correlation information sending module 322.

The order receiving module 310 receives an order request from a first communication terminal, and acquires a first communication number according to the order request.

In this example embodiment, the first communication terminal may be a smart phone, a desktop computer, a notebook computer, a tablet personal computer, or a smart wearable device. Certainly, the first communication terminal may also be a software entity that is executable by any of the devices listed above, and the first communication terminal may be used by a user to send an order request.

In this example embodiment, the order request may include ordering evidence in a trading transaction, and its specific content may include a commodity and/or service ordered by a user.

In this example embodiment, the order request may carry the first communication number, and specifically, for example, the order request may include the first communication number. In this way, after the order request is received, the first communication number can be acquired. The order request may also not include the first communication number. In this case, through identity information included in the order request, the first communication number corresponding to the identity information can be read from a local database.

In this example embodiment, the first communication number may be a user's telephone number, which may be a landline telephone number or a mobile phone number. The number segment is not restricted.

The allocating module 312 allocates a second communication number to the first communication number, and sets a correlation between the first communication number and the second communication number.

In this example embodiment, the second communication number is used as a temporary communication number. The allocating a second communication number to the first communication number may include: pre-storing at least one second communication number locally in the server 300, and selecting one from the at least one second communication number to allocate to the first communication number; or, after the order request is received, generating a second communication number according to a pre-set rule.

In a specific example embodiment, a communication number set is set locally in the server 300, and the communication number set includes at least one second communication number. In this way, a value range of the second communication number is effectively defined, and usage condition of the second communication number is managed. For example, in the current situation about selecting the existing communication numbers, the seldom used numbers may be used as temporary communication numbers; numbers in a certain segment may be used as temporary communication numbers. For instance, numbers falling within "95000000000~95011111111" are used as temporary communication numbers.

In this example embodiment, the allocating module 312 sets the correlation between the first communication number and the second communication number. For example, the server 300 stores and correlates the second communication number and the first communication number with each other in a manner of a data table. That is, one column in the data table stores the first communication number, another column stores the second communication number, and the first communication number and the second communication number correlated with each other are located in the same line. Alternatively, the server 300 may store the first communication number and an index of the second communication number corresponding to each other. For example, a serial number is given to each second communication number in the communication number set, and the serial number is an index of the corresponding second communication number. By using the index, a second communication number is uniquely determined. Thus, by way of storing the first communication number and the index correspondingly, the second communication number corresponding to the first communication number is figured out.

The first correlation information sending module 314 sends first correlation information to a basic communication server, in which the first correlation information carries the first communication number and the second communication number.

In this example embodiment, the basic communication server may be a server of a telecom operator, which calls a communication number according to a call request.

In this example embodiment, the first correlation information sending module 314 sends the correlation information to the basic communication server, which indicates that there is a need to correlate the first communication number with the second communication number carried by the correlation information.

In this example embodiment, the first correlation information carries the first communication number and the second communication number. Both the first communication number and the second communication number may be used as content or a part of the content of the correlation information. Alternatively, one of the second communication number and the first communication number is used as content or a part of the content of the correlation information, with the other one being used as an attachment. Alternatively, both the second communication number and the first communication number may be used as attachments of the correlation information. For example, the second communication number may be "12345678900", the first communication number may be "17095058888." A content of the first correlation information may be "Binding 17095058888&12345678900", "17095058888&12345678900", "Binding 17095058888" with "12345678900" being used as an attachment, "Binding 12345678900" with "17095058888" being used as an attachment, or "Binding" with both "17095058888" and "12345678900" being used as the attachments.

The binding module 316 binds the second communication number with the order request.

In this example embodiment, the binding module 316 binds the second communication number with the order request. Thus, in a subsequent step for processing the order request, when a third party reads and processes the order request, it can only acquire the second communication number, instead of acquiring the user's first communication number, thereby effectively protecting the user's communication number.

In this example embodiment, the binding module 316 binds the second communication number with the order request in the following ways including: setting the second communication number as a part of the content of the order request; setting the second communication number as an attachment of the order request; storing the order request and the second communication number corresponding to each other; or storing an order serial number of the order request and the second communication number corresponding to each other, in which the order serial number uniquely identifies an order request. Certainly, the way of binding the second communication number with the order request is not limited to the above cited examples, and those skilled in the art may further make other variations under the teaching of the technical essence of the present disclosure, while all the variations shall fall within the protection scope of the present disclosure as long as the implemented functions and effects thereof are the same as or similar to that of the present disclosure.

The order request issuing module 318 issues the order request, in which the order request carries the second communication number.

In this example embodiment, the issuing the order request may include issuing the order request by way of broadcasting, so that other communication terminals acquire information about the order request by communicating with the server. Alternatively, the issuing the order request may also include sending the order request to a designated communication terminal.

In this example embodiment, the order request carries the second communication number. For example, the second communication number is a part of a content of the order request; or the second communication number is an attachment of the order request.

The response information receiving module 320 receives response information of the second communication terminal and acquires the third communication number according to the response information.

In this example embodiment, the second communication terminal may be a smart phone, a desktop computer, a notebook computer, a tablet personal computer, or a smart wearable device. Certainly, a user terminal may also be a software entity that is executable by any of the devices listed above. The second communication terminal may be set at commercial operating places or facilities, for example, stores for selling products, companies for providing logistics services, or taxies.

In this embodiment, after receiving the order request, the second communication terminal may respond to the order request, and send the response information. For example, the order request is taxi booking information sent by a user to a taxi platform. After the taxi platform issues the taxi booking information, communication terminals, used by taxi drivers, which are connected with the taxi platform receive the taxi booking information. Once a certain taxi driver uses the communication terminal to send response information at the earliest time, it indicates that the taxi driver obtains the order successfully, and can further contact the user who sent the taxi booking information.

In this example embodiment, a third communication number is acquired according to the response information. For example, when the third communication number is a part of a content of the response information, the third communication number is directly read from the response information; when the third communication number is an attachment of the response information, the attachment of the response information is read after the response information is acquired, to further acquire the third communication number; or when the response information further carries identity information, a communication number corresponding to the identity information, that is, the third communication number, is looked up from stored data according to the identity information.

The second correlation information sending module 322 sends second correlation information to the basic communication server, in which the second correlation information at least carries the second communication number and the third communication number.

In this example embodiment, after the response information is received, the third communication number in the response information is sent to the basic communication server so that the basic communication server binds the third communication number with the second communication number. Since the second communication number and the first communication number have a binding relation therebetween, the third communication number is correlated with the first communication number through the second communication number. After receiving a communication request from the first communication number to the second communication number, the basic communication server converts the communication request into a call to the third communication number, thereby establishing communications between a communication device using the first communication number and a communication device using the third communication number. Furthermore, a current calling number provided to a communication device using the third communication number is the second communication number, so that the communication device using the third communication number cannot obtain the first communication number, and meanwhile, the communication device using the first communication number cannot obtain the third communication number either. Similarly, after receiving a communication request from the third communication number to the second communication number, the basic communication server converts it into a call to the first communication number, thereby establishing communications between the communication device using the third communication number and the communication device using the first communication number. A current calling number provided to the communication device using the first communication number is the third communication number.

Figure 4:
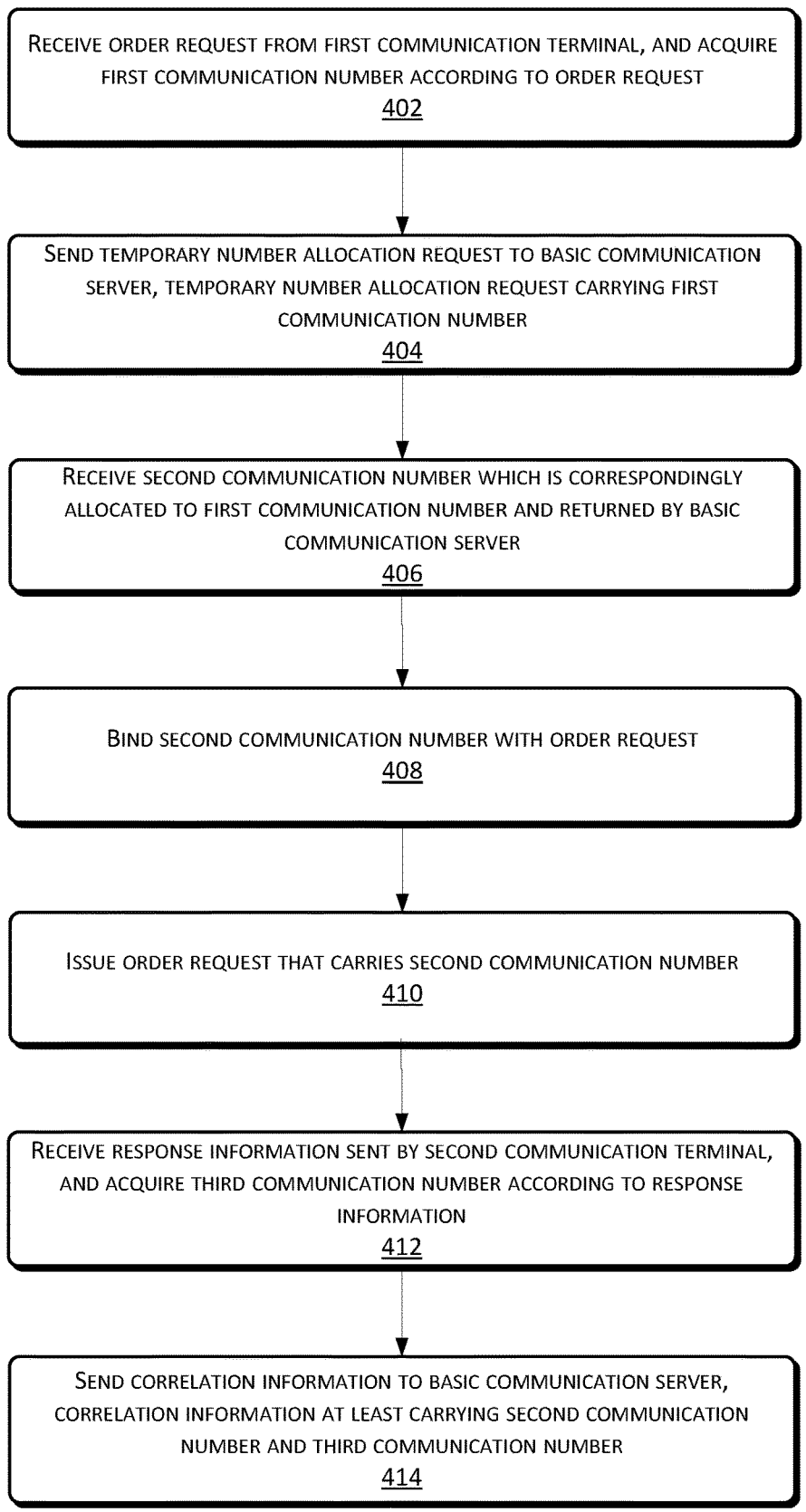
FIG. 4 is a flow chart of an example data interaction method according to an example embodiment of the present disclosure.

Referring to FIG. 4, an example embodiment of the present disclosure further provides an example order data interaction method, which includes the following steps:

At 402, an order request is received from a first communication terminal, and a first communication number is acquired according to the order request.

In this example embodiment, the first communication terminal may be a smart phone, a desktop computer, a notebook computer, a tablet personal computer, or a smart wearable device. Certainly, the first communication terminal may also be a software entity that is executable by any of the devices listed above, and the first communication terminal may be used by a user to send an order request.

In this example embodiment, the order request may include ordering evidence in a trading transaction, and its specific content may include a commodity and/or service ordered by a user.

In this example embodiment, the order request may carry the first communication number, and, for example, the order request may include the first communication number. In this way, after the order request is received, the first communication number is acquired. Alternatively, the order request does not include the first communication number. In this case, through identity information included in the order request, the first communication number corresponding to the identity information is read from a local database.

In this example embodiment, the first communication number may be a user's telephone number, which may be a landline telephone number or a mobile phone number. The number segment is not restricted.

At 404, a temporary number allocation request is sent to a basic communication server, the temporary number allocation request carrying the first communication number.

In this example embodiment, the basic communication server may be a server of a telecom operator, which calls a communication number in response to a call request of a communication terminal.

In this example embodiment, the temporary number allocation request represents that the user applies a temporary communication number directed to his/her first communication number, so that the temporary communication number is adopted during the subsequent communication with a third party, thereby avoiding the leakage of the first communication number. The temporary number allocation request may have a pre-set form. The temporary number allocation request may have a pre-set content. For example, the content thereof may be "Request temporary number". Certainly, the form and the content of the temporary number allocation request are not limited to the above example.

In this example embodiment, the temporary number allocation request carries the first communication number, which may include that the first communication number is content or a part of the content of the temporary number allocation request. For example, the first communication number is "17095058888." The temporary number allocation request may be only "17095058888", or "Request temporary number & 17095058888" as well. The temporary number allocation request carries the first communication number, and the first communication number may also be used as an attachment of the temporary number allocation request.

At 406, a second communication number, which is correspondingly allocated to the first communication number and returned by the basic communication server, is received.

In this example embodiment, the basic communication server, in response to the temporary number allocation request, allocates a temporary communication number to the first communication number. The temporary communication number is the second communication number. For example, at least one temporary communication number is pre-stored in the basic communication server, and one of the at least one temporary communication number is selected and allocated to an original communication number; or after the basic communication server receives an allocation request, one temporary communication number is generated according to a pre-set rule, and the generated temporary communication number is allocated to the first communication number.

In this example embodiment, the correspondingly allocating the second communication number to the first communication number indicates that a one-to-one relation exists between each first communication number and the temporary communication number.

At 408, the second communication number is bound with the order request.

In this example embodiment, the binding of the second communication number with the order request enables that, in a subsequent step for processing the order request, when a third party reads and processes the order request, it can only acquire the second communication number, instead of acquiring the user's first communication number, thereby effectively protecting the user's communication number.

In this example embodiment, the binding of the second communication number with the order request may be implemented in the following ways, which may include: setting the second communication number as a part of the content of the order request; setting the second communication number as an attachment of the order request; storing the order request and the second communication number corresponding to each other; or storing an order serial number of the order request and the second communication number corresponding to each other, in which the order serial number uniquely identifies an order request. Certainly, the way of binding the second communication number with the order request is not limited to the above examples, and those skilled in the art may further make other variations under the teaching of the technical essence of the present disclosure, while all the variations shall fall within the protection scope of the present disclosure as long as the implemented functions and effects thereof are the same as or similar to that of the present disclosure.

At 410, the order request is issued and the order request carries the second communication number.

In this example embodiment, the issuing the order request may include issuing the order request by way of broadcasting, so that other communication terminals may acquire information about the order request by communicating with the server. Alternatively, the issuing the order request may also include sending the order request to a designated communication terminal.

In this example embodiment, the order request carries the second communication number, which may include that the second communication number is a part of a content of the order request or the second communication number is an attachment of the order request.

At 412, response information sent by a second communication terminal is received, and a third communication number is acquired according to the response information.

In this example embodiment, the second communication terminal may be a smart phone, a desktop computer, a notebook computer, a tablet personal computer, or a smart wearable device. Definitely, a user terminal may also be a software entity that is executable by any of the devices listed above. The second communication terminal may be set at commercial operating places or facilities, such as stores for selling products, companies for providing logistics services, or taxies.

In this example embodiment, after receiving the order request, the second communication terminal responds to the order request, and sends the response information. For example, the order request is taxi booking information sent by a user to a taxi platform. After the taxi platform issues the taxi booking information, communication terminals, used by taxi drivers, which are connected with the taxi platform, receive the taxi booking information. Once a certain taxi driver uses the communication terminal to send response information at the earliest time, it indicates that the taxi driver obtains the order successfully, and may further contact the user who sent the taxi booking information.

In this example embodiment, the acquiring a third communication number according to the response information includes: for example, when the third communication number is a part of a content of the response information, directly reading the third communication number from the response information; when the third communication number is an attachment of the response information, reading the attachment of the response information after the response information is acquired, to further acquire the third communication number; or when the response information further carries identity information, looking up a communication number corresponding to the identity information, that is, the third communication number, from stored data according to the identity information.

At 414, the correlation information is sent to the basic communication serve. The correlation information at least carries the second communication number and the third communication number.

In this example embodiment, after the response information is received, the third communication number in the response information is sent to the basic communication server so that the basic communication server binds the third communication number with the second communication number. Since the second communication number and the first communication number have a binding relation therebetween, the third communication number is correlated with the first communication number through the second communication number. After receiving a communication request from the first communication number to the second communication number, the basic communication server converts the communication request into a call to the third communication number, thereby establishing communications between a communication device using the first communication number and a communication device using the third communication number. Furthermore, a current calling number provided to a communication device using the third communication number is the second communication number, so that the communication device using the third communication number cannot obtain the first communication number, and meanwhile, the communication device using the first communication number cannot obtain the third communication number either. Similarly, after receiving a communication request from the third communication number to the second communication number, the basic communication server converts it into a call to the first communication number, thereby establishing communications between the communication device using the third communication number and the communication device using the first communication number. A current calling number provided to the communication device using the first communication number is the third communication number.

In an example embodiment, the method further includes binding the third communication number with the order request. Thus, it indicates that the order request has been obtained by the communication device using the third communication number, and communication devices using other communication numbers cannot respond to the order request any more.

In addition, a failure event for the binding of the second communication number with the order request is set; and when the failure event is detected to occur, a failure request for correlation information between the second communication number and the first communication number and the third communication number is sent to the basic communication server. Details may refer to FIG. 2 and its accompanying descriptions, which are not detailed herein.

Figure 5:
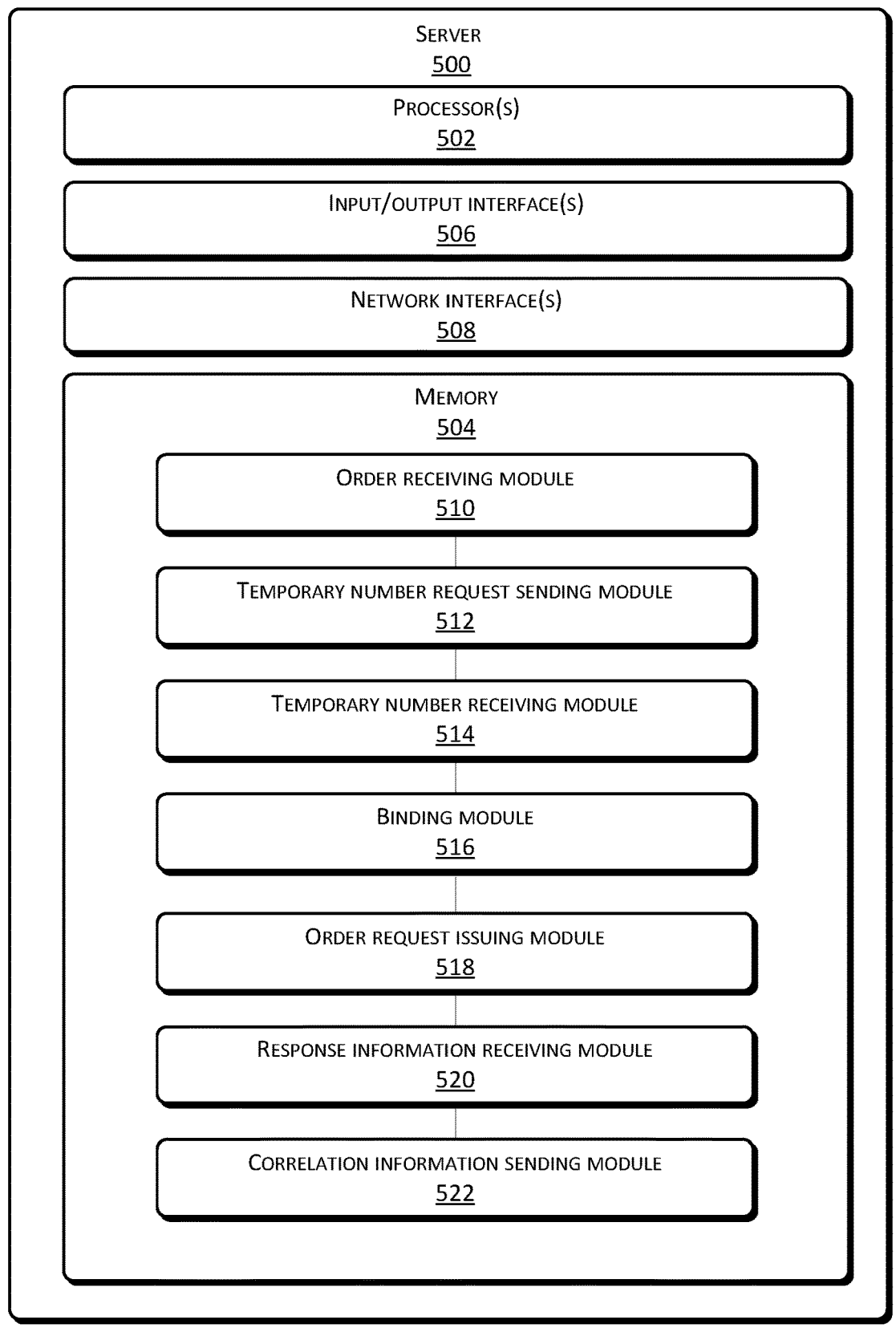
FIG. 5 is a block diagram of an example server according to an example embodiment of the present disclosure.

Referring to FIG. 5, an example embodiment of the present disclosure further provides a server 500, which includes one or more processor(s) 502 or data processing unit(s) and memory 504. The server 500 may further include one or more input/output interface(s) 506, and network interface(s) 508. The memory 504 is an example of computer-readable media.

The memory 504 may store therein a plurality of modules or units including an order receiving module 510, a temporary number request sending module 512, a temporary number receiving module 514, a binding module 516, an order request issuing module 518, a response information receiving module 520, and a correlation information sending module 522.

The order receiving module 510 receives an order request from a first communication terminal, and acquires a first communication number according to the order request.

In this example embodiment, the first communication terminal may be a smart phone, a desktop computer, a notebook computer, a tablet personal computer, or a smart wearable device. Certainly, the first communication terminal may also be a software entity that is executable by any of the devices listed above, and the first communication terminal may be used by a user to send an order request.

In this example embodiment, the order request may include ordering evidence in a trading transaction, and its specific content may include a commodity and/or service ordered by a user.

In this example embodiment, the order request may carry the first communication number. For example, the order request may include the first communication number. In this way, after the order request is received, the first communication number is acquired. Alternatively, the order request does not include the first communication number. In this case, through identity information included in the order request, the first communication number corresponding to the identity information can be read from a local database.

In this example embodiment, the first communication number may be a user's telephone number, which may be a landline telephone number or a mobile phone number. There is no restriction on the number segment.

The temporary number request sending module 512 sends a temporary number allocation request to a basic communication server, in which the temporary number allocation request carries the first communication number.

In this example embodiment, the basic communication server may be a server of a telecom operator, which calls a communication number in response to a call request of a communication terminal.

In this example embodiment, the temporary number allocation request represents that the user applies a temporary communication number directed to his/her first communication number, so that the temporary communication number is adopted during the subsequent communication with a third party, thereby avoiding the leakage of the first communication number. The temporary number allocation request may have a pre-set form. The temporary number allocation request may have a pre-set content such that the content thereof may be "Request temporary number". Certainly, the form and the content of the temporary number allocation request are not limited to the above cited example.

In this example embodiment, the temporary number allocation request carries the first communication number, which may include that the first communication number is content or a part of the content of the temporary number allocation request. For example, the first communication number is "17095058888". The temporary number allocation request may be only "17095058888", or "Request temporary number & 17095058888". The temporary number allocation request carries the first communication number. Alternatively, the first communication number may be used as an attachment of the temporary number allocation request.

The temporary number receiving module 514 receives a second communication number, correspondingly allocated to the first communication number, returned by the basic communication server.

In this example embodiment, the basic communication server, in response to the temporary number allocation request, allocates a temporary communication number to the first communication number. The temporary communication number is the second communication number. For example, at least one temporary communication number is be pre-stored in the basic communication server, and one of the at least one temporary communication number is selected and allocated to an original communication number; or after the basic communication server receives an allocation request, one temporary communication number is generated according to a pre-set rule, and the generated temporary communication number is allocated to the first communication number.

In this example embodiment, the correspondingly allocating the second communication number to the first communication number may indicate that a one-to-one relation exists between each first communication number and the temporary communication number.

The binding module 516 binds the second communication number with the order request.

In this example embodiment, the binding module 516 binds the second communication number with the order request, which enables that, in a subsequent step for processing the order request, when a third party reads and processes the order request, it can only acquire the second communication number, instead of acquiring the user's first communication number, thereby effectively protecting the user's communication number.

In this example embodiment, the binding of the second communication number with the order request may be implemented in the following ways, which may include: setting the second communication number as a part of the content of the order request; setting the second communication number as an attachment of the order request; or storing the order request and the second communication number corresponding to each other; or storing an order serial number of the order request and the second communication number corresponding to each other, in which the order serial number uniquely identifies an order request. Certainly, the way of binding the second communication number with the order request is not limited to the above examples, and those skilled in the art may further make other variations under the teaching of the technical essence of the present disclosure, while all the variations shall fall within the protection scope of the present disclosure as long as the implemented functions and effects thereof are the same as or similar to that of the present disclosure.

The order request issuing module 518 issues the order request, which carries the second communication number.

In this example embodiment, the issuing the order request may include issuing the order request by way of broadcasting, so that other communication terminals may acquire information about the order request by communicating with the server. Alternatively, the issuing the order request may also include sending the order request to a designated communication terminal.

In this example embodiment, the order request carries the second communication number. The second communication number is a part of a content of the order request or an attachment of the order request.

The response information receiving module 520 receives response information sent by a second communication terminal, and acquires a third communication number according to the response information.

In this example embodiment, the second communication terminal may be a smart phone, a desktop computer, a notebook computer, a tablet personal computer, or a smart wearable device. Definitely, a user terminal may also be a software entity that is executable by any of the devices listed above. The second communication terminal may be set at commercial operating places or facilities such as stores for selling products, companies for providing logistics services, or taxies.

In this example embodiment, after receiving the order request, the second communication terminal responds to the order request, and sends the response information. For example, the order request is taxi booking information sent by a user to a taxi platform. After the taxi platform issues the taxi booking information, communication terminals, used by taxi drivers, which are connected with the taxi platform, receive the taxi booking information. Once a certain taxi driver uses the communication terminal to send response information at the earliest time, it indicates that the taxi driver obtains the order successfully, and may further contact the user who sent the taxi booking information.

In this example embodiment, the acquiring a third communication number according to the response information may includes: for example, when the third communication number is a part of a content of the response information, directly reading the third communication number from the response information; when the third communication number is an attachment of the response information, reading the attachment of the response information after the response information is acquired, to further acquire the third communication number; or when the response information further carries identity information, looking up a communication number corresponding to the identity information, that is, the third communication number, from stored data according to the identity information.

The correlation information sending module 522 sends correlation information to the basic communication server. The correlation information at least carries the second communication number and the third communication number.

In this example embodiment, after the response information is received, the third communication number in the response information is sent to the basic communication server so that the basic communication server binds the third communication number with the second communication number. Since the second communication number and the first communication number have a binding relation therebetween, the third communication number is correlated with the first communication number through the second communication number. After receiving a communication request from the first communication number to the second communication number, the basic communication server converts the communication request into a call to the third communication number, thereby establishing communications between a communication device using the first communication number and a communication device using the third communication number. Furthermore, a current calling number provided to a communication device using the third communication number is the second communication number, so that the communication device using the third communication number cannot obtain the first communication number, and meanwhile, the communication device using the first communication number cannot obtain the third communication number either. Similarly, after receiving a communication request from the third communication number to the second communication number, the basic communication server converts it into a call to the first communication number, thereby establishing communications between the communication device using the third communication number and the communication device using the first communication number. A current calling number provided for the communication device using the first communication number is the third communication number.

As shown from the technical solutions provided by the example embodiments of the present disclosure, during the flow for processing an order data, the present disclosure binds a temporarily allocated temporary communication number with an order request and sets a correlation between the second communication number with the communication numbers of the buyer and the seller. Thus, during the whole flow for processing an order request, the buyer and the seller can only acquire the second communication number, and contact each other by using the second communication number, thereby effectively preventing leakage of the communication numbers of the buyer and the seller and protecting user privacy.

Although the present disclosure has been described through the example embodiments, those ordinarily skilled in the art shall know that, many modifications and variations may be made to the present disclosure, without departing from the spirits of the present disclosure, and the appended claims are expected to cover those modifications and variations without departing from the spirits of the present disclosure.

What is claimed is:

1. A method comprising:
   receiving an order request sent by a first communication terminal;
   acquiring a first communication number of the first communication terminal according to the order request;
   allocating a second communication number to the first communication number, the second communication number being a calling number;
   setting a first correlation between the first communication number and the second communication number;
   assigning an index to the second communication number, the index uniquely determining the second communication number;
   storing the first communication number and the index in correspondence with each other;
   sending, by a server, the order request to one or more communication terminals, the order request including the second communication number;
   receiving response information corresponding to the order request, sent by a second communication terminal of the one or more communication terminals;
   obtaining a third communication number of the second communication terminal according to the response information;
   setting a second correlation between the second communication number and the third communication number; and
   establishing communication between a user of the first communication terminal and a user of the second communication terminal using the second communication number as the calling number to protect privacy of the user of the first communication terminal and the user of the second communication terminal.

2. The method of claim 1, further comprising sending first correlation information to a basic communication server, the first correlation information carrying the first communication number and the second communication number.

3. The method of claim 2, further comprising sending second correlation information to the basic communication server, the second correlation information carrying at least the second communication number and the third communication number.

4. The method of claim 2, further comprising binding the third communication number with the order request.

5. The method of claim 1, further comprising setting a failure event for the binding of the second communication number with the order request.

6. The method of claim 5, further comprising: sending a failure request for the correlation of the second communication number and the first communication number and the third communication number, upon detecting that the failure event occurred.

7. The method of claim 5, wherein the failure event includes that a current time exceeds a set valid time.

8. The method of claim 5, wherein the failure event is determined according to a state of the order request.

9. The method of claim 5, wherein the failure event includes that the order request is invalid.

10. A method comprising:
    receiving an order request sent by a first communication terminal;
    acquiring a first communication number of the first communication terminal according to the order request;
    allocating a second communication number to the first communication number;
    assigning an index to the second communication number, the index uniquely determining the second communication number;
    storing the first communication number and the index in correspondence with each other;
    sending, by a server, the order request to one or more communication terminals, the order request including the second communication number;
    receiving response information corresponding to the order request, sent by a second communication terminal of the one or more communication terminals;
    obtaining a third communication number of the second communication terminal according to the response information;
    setting a triplet binding relation among the first communication number, the second communication number and the third communication number; and
    establishing communication between a user of the first communication terminal and a user of the second communication terminal using] the second communication number as a calling number to protect privacy of the user of the first communication terminal and the user of the second communication terminal.

11. The method of claim 10, further comprising binding the first communication number, the second communication number, and the third communication number with the order request.

12. The method of claim 10, further comprising setting a failure event for the binding of the second communication number with the order request.

13. The method of claim 12, further comprising:
    sending a failure request of the correlation of the second communication number and the first communication number and the third communication number, upon detecting that the failure event occurred.

14. The method of claim 12, wherein the failure event includes that a current time exceeds a set valid time.

15. The method of claim 12, wherein the failure event is determined according to a state of the order request.

16. The method of claim 12, wherein the failure event includes that the order request is invalid.

17. A server comprising:
one or more processors; and
memory including instructions that, when executed by the one or more processors, cause the one or more processors to perform acts comprising:
receiving an order request from a first communication terminal, and acquiring a first telephone number according to the order request;
allocating a second telephone number to the first telephone number, and setting a first correlation between the first telephone number and the second telephone number;
assigning an index to the second telephone number, the index uniquely determining the second telephone number;
storing the first telephone number and the index in correspondence with each other;
binding the second telephone number with the order request;
sending, by a server, the order request to one or more communication terminals, the order request including the second telephone number;
receiving response information sent by a second communication terminal of the one or more communication terminals and acquiring a third telephone number according to the response information;
setting a second correlation between the second telephone number and the third telephone number, and sending the first correlation and the second correlation to a basic communication server, the second correlation information carrying at least the second telephone number and the third telephone number; and
establishing communication between a user of the first communication terminal and a user of the second communication terminal using the second telephone number to protect privacy of the user of the first communication terminal and the user of the second communication terminal.

18. The server of claim 17, wherein the method further comprises setting a failure event for the binding of the second telephone number with the order request.

* * * * *